United States Patent
Weller

[15] 3,663,297
[45] May 16, 1972

[54] PROCESS FOR THE PREPARATION OF SINTERED ZINC POWDER BATTERY ELECTRODES

[72] Inventor: Richard D. Weller, Laurel, Md.

[73] Assignee: The United States of America as represented by the Secretary of the Navy

[22] Filed: June 24, 1970

[21] Appl. No.: 49,548

[52] U.S. Cl. .................................136/30, 136/126, 75/201
[51] Int. Cl. .........................................................H01m 41/00
[58] Field of Search .............................136/31, 30, 125–130, 136/120; 75/201, 211, 214, 222, 223, 224; 264/49, 104, 111

[56] References Cited

UNITED STATES PATENTS

| | | | |
|---|---|---|---|
| 3,322,535 | 5/1967 | Rao | 75/201 |
| 3,337,336 | 8/1967 | Rao | 75/201 |
| 3,384,482 | 5/1968 | Kelly et al. | 75/201 |
| 3,348,976 | 10/1967 | Kelly et al. | 136/30 |
| 2,561,943 | 7/1951 | Moulton | 136/31 |
| 3,071,638 | 1/1963 | Clark et al. | 136/31 |
| 3,397,057 | 8/1968 | Harrington et al. | 75/211 |
| 1,996,220 | 4/1935 | Tigerschiöld et al. | 264/111 |
| 3,427,204 | 2/1969 | Clune et al. | 136/30 |

Primary Examiner—Winston A. Douglas
Assistant Examiner—C. F. Lefevour
Attorney—R. S. Sciascia, J. A. Cooke and R. J. Erickson

[57] ABSTRACT

Sintered zinc powder battery electrodes are prepared by (1) rinsing zinc powder with a solvent that dissolves zinc oxide at a faster rate than it dissolves zinc and which is saturated with a water soluble salt having a higher melting point than zinc; (2) pouring off the solvent; (3) mixing the zinc with the water soluble salt used in step (1); (4) packing the mixture around a metal screen that is made of a metal which is an electrical conductor having a higher melting point than zinc; (5) heating the packed article at a temperature above 419° C but below the melting point of the water soluble salt and the metal screen; (6) cooling the article; and, (7) soaking the article in water to remove the water soluble salt.

9 Claims, No Drawings

PROCESS FOR THE PREPARATION OF SINTERED ZINC POWDER BATTERY ELECTRODES

BACKGROUND OF THE INVENTION

This invention generally relates to battery electrodes and more particularly to sintered zinc powder battery electrodes.

Zinc electrodes have been made in the past by simple compacting of powder or granular zinc. These electrodes, however, have not had true metal to metal bonds because during sintering zinc oxide forms on the surface of each individual particle preventing such contact. As a consequence, these electrodes have poor mechanical strength and lose a good portion of the available zinc due to dropping off of particles during discharge and electrical isolation of portions of the electrode from the external circuit.

Other previously employed methods of producing zinc electrodes include forming amalgams with mercury, forming composites which contain organic materials and wrapping loose zinc powder in a bag of porous material. Again, the electrodes produced by these prior art methods leave much to be desired.

SUMMARY OF THE INVENTION

Accordingly, one object of this invention is to provide a process for the preparation of sintered zinc powder battery electrodes.

Another object of this invention is to provide sintered zinc powder battery electrodes which have relatively good mechanical strength.

Still another object of this invention is to provide sintered zinc powder battery electrodes which have a relatively high efficiency of zinc conversion.

These and other objects of this invention are accomplished by providing a process to produce sintered zinc powder battery electrodes comprising: (1) rinsing zinc powder with a solvent that dissolves zinc oxide at a faster rate than it dissolves zinc and which is saturated with a water soluble salt that has a higher melting point than zinc; (2) pouring off the solvent; (3) mixing the damp zinc with the water soluble salt used in Step (1); (4) packing the mixture around a screen made of a metal which is an electrical conductor and which has a higher melting point than zinc; (5) heating the packed article at a temperature above 419° C but below the melting point of the water soluble salt or the metal screen; (6) cooling the article; and, (7) soaking the article in water to remove the water soluble salt.

DESCRIPTION OF THE PREFERRED EMBODIMENT

The process of the instant invention to produce sintered zinc powder battery electrodes comprises a number of steps to be performed.

First, the zinc powder is rinsed with a solvent that can dissolve zinc oxide at an appreciably faster rate then it dissolves zinc in order to remove all the zinc oxide that has formed on the powdered zinc. The zinc powder may have just about any particle size since particle size is not a critical feature of this invention, although a preferred size is smaller than 60 mesh. This solvent should be saturated with a water soluble salt which has a higher melting point than zinc. The same salt in powdered form is also used in step (3), hereinafter described in greater detail. Common solvents that can be used in this step of the instant process include acids such as HCl, $H_2SO_4$ and $HNO_3$ (preferably about 1N or between 0.25N and about 1N), NaOH KOH and $NH_4OH$ (5–40 percent by weight solutions). Other solvents which dissolve zinc oxide at an appreciably faster rate than they dissolve zinc can be used. The contact time is preferably rather short, generally in the neighborhood of about 30 to 60 seconds because some of the solvents, such as the acids will start to attack the zinc if contacting is continued for a longer period of time. When a solvent that does not attack zinc is used the contacting may continue indefinitely.

After contacting the solvent is poured off leaving the zinc powder in a damp condition. The damp zinc powder is then mixed and packed with a powdered water soluble salt that has a higher melting point than zinc. This is the salt which was used to saturate the solvent in the first step of this process. The particle size of the salt, like that of the zinc, is not critical but is preferably a size smaller than 60 mesh. The ratio of the salt used to the zinc powder can be varied depending on the quality of the zinc electrode desired. Preferably the ratio of salt to zinc powder varies between 0.38 and 1.5. Some water soluble salts that may be used in this step are NaCl, KCl, LiCl etc. Any of the commonly used metal screens are to be included in the middle of the electrode as the mixture of salts is compacted. The metal screen should, of course, be electrically conductive and have a melting point that is not only higher than that of zinc but higher than the temperature to which the electrode will be heated in the heating step, hereinafter described. Commonly used screens are made of silver, nickel, copper and iron. The packing is carried out in any conventional manner.

After packing the electrode is heated, preferably in a furnace with an inert atmosphere. The electrode must be heated to at least the melting point of zinc (419° C) but must not be heated to a temperature which will melt either the water soluble salt or the metal screen inserted into the electrode. After the zinc melts the electrode is held together by the salt and the zinc is held in place by surface tension. All that is necessary is that the temperature be kept above 419° C until the zinc has melted. As will be understood by one of ordinary skill in the art, the zinc in the packed article will melt when the furnace reaches 419° C but the article is preferably kept in the furnace for a short period of time after it reaches 419° C or the temperature is raised beyond 419° C to insure that all the zinc present in the electrode has melted. However, it should not be kept above 419° C for more than about 5 minutes to avoid puddling of the zinc. With coarse size particles a heat treatment for a shorter period of time than with the finer size particles may be had.

After heating the electrode is allowed to cool and then soaked in water in order to remove the water soluble salt. This leaves the desired sintered zinc powder battery electrode with the metal screen therein.

The general nature of the invention having been set forth, the following example is presented as a specific illustration thereof. It will be understood that the invention is not limited to this specific example but is susceptible to various modifications that will be recognized by one of ordinary skill in the art.

EXAMPLE 20 grams of zinc powder was rinsed with 1N HCl which was saturated with NaCl. Contacting was maintained for about 30 seconds in order to remove the zinc oxide coating from the zinc particles. Most of the HCl was then poured off leaving the zinc powder damp. 8 grams of NaCl powder was added to the wet zinc making a damp mixture of NaCl and zinc powers. This mixture was packed into a die while it was still damp and pressed to 7,000 psi into an electrode which was approximately 1½ × 1½ × ⅛ inches. A silver metal screen was included in the middle for a current collector. The pressed electrode, still damp, was held between two discs of sintered glass and placed into an argon atmosphere furnace which was heated up to 500° C in approximately 15 minutes. This temperature was then held for about 1 more minute. After cooling the electrode was removed and soaked in water to dissolve the NaCl thus leaving the zinc electrode.

Obviously, numerous modifications and variations of the present invention are possible in light of the above teachings. It is therefore understood that within the scope of the appended claims the invention may be practiced otherwise than as specifically described herein.

What is claimed as new and desired to be secured by Letters Patent of the United States is:

1. A process for the production of a zinc powder battery electrode comprising a. rinsing zinc powder with a solvent selected from the group consisting of alkaline and acid solvents which dissolves zinc oxide at a faster rate than it dissolves zinc so as to remove zinc oxide and which is saturated with an inorganic water soluble salt which has a higher melting point than zinc;
b. pouring off said solvent to obtain damp zinc powder;
c. mixing said damp zinc powder with the powder of said inorganic water soluble salt that has a higher melting point than zinc used in step (a);
d. packing the mixture, obtained in step (c), around a metal screen wherein said metal screen is a conductor of electricity and is made of a metal that has a higher melting point than zinc;
e. heating the packed article of step (d) in an inert atmosphere at a temperature above 419° C but below the melting point of said metal screen and said inorganic water soluble salt for a time period not to exceed 5 minutes;
f. cooling said article, and
g. soaking said article in water to remove said inorganic water soluble salt.

2. The process according to claim 1 wherein the particle size of said powdered zinc and said powdered inorganic water soluble salt is smaller than 60 mesh.

3. The process according to claim 2 wherein the ratio of the inorganic water soluble salt to zinc is between 0.38 and 1.5.

4. The process according to claim 3 wherein said inorganic water soluble salt is selected from the group consisting of NaCl, KCl and LiCl.

5. The process according to claim 4 wherein said solvent to dissolve the zinc oxide is selected from the group consisting of 5–40 percent NaOH, KOH and $NH_4OH$.

6. The process according to claim 4 wherein said solvent to dissolve the zinc oxide is selected from the group consisting of about 0.25N to about 1N HCl, $H_2SO_4$ and $HNO_3$.

7. A process according to claim 5 wherein said metal screen is composed of a metal selected from the group consisting of silver, nickel, copper and iron.

8. A process according to claim 6 wherein said metal screen is composed of a metal selected from the group consisting of silver, nickel, copper and iron.

9. A process according to claim 8 wherein said solvent to dissolve zinc oxide is about 1N HCl, said water soluble salt is NaCl and said metal screen is silver.

* * * * *